(12) United States Patent
Chordia et al.

(10) Patent No.: US 7,091,366 B2
(45) Date of Patent: Aug. 15, 2006

(54) RECOVERY OF RESIDUAL SPECIALTY OIL

(75) Inventors: Lalit Chordia, Pittsburgh, PA (US); Jose L. Martinez, Gibsonia, PA (US)

(73) Assignee: Thar Technologies, inc., Pittsburgh, PA (US)

(*) Notice: Subject to any disclaimer, the term of this patent is extended or adjusted under 35 U.S.C. 154(b) by 0 days.

(21) Appl. No.: 10/949,631

(22) Filed: Sep. 24, 2004

(65) Prior Publication Data

US 2005/0070726 A1    Mar. 31, 2005

Related U.S. Application Data

(60) Provisional application No. 60/505,904, filed on Sep. 25, 2003.

(51) Int. Cl.
*C11B 1/00*    (2006.01)

(52) U.S. Cl. ........................................................ 554/8

(58) Field of Classification Search ..................... 554/8
See application file for complete search history.

(56) References Cited

U.S. PATENT DOCUMENTS

| | | | |
|---|---|---|---|
| 4,357,865 A | 11/1982 | Knuth et al. | |
| 4,466,923 A | 8/1984 | Friedrich | |
| 4,675,133 A | 6/1987 | Eggers et al. | |
| 6,278,005 B1 | 8/2001 | Namiki et al. | |
| 6,350,890 B1 | 2/2002 | Kly et al. | |

FOREIGN PATENT DOCUMENTS

GB    2091292    7/1982

*Primary Examiner*—Deborah D. Carr
(74) *Attorney, Agent, or Firm*—Meyer, Unkovic & Scott LLP; David G. Oberdick, Esq.; Christian M. Best, Esq.

(57) ABSTRACT

The present invention provides a means for the recovery of residual specialty oils from cake using a compressed solvent, preferably carbon dioxide. The present invention also allows for the cake to be toasted before extraction. The compressed solvent can be recycled and the process is continuous.

20 Claims, 2 Drawing Sheets

RECOVERY OF RESIDUAL SPECIALTY OIL

CROSS-REFERENCE TO RELATED APPLICATION

This patent application claims priority from the U.S. provisional patent application of the same title, which was filed on Sep. 25, 2003 and assigned U.S. patent application No. 60/505,904.

BACKGROUND OF THE INVENTION

Specialty oils are valuable commodities for a number of reasons, including but not limited to their nutritional, cosmetic, and therapeutic uses. The term "specialty oil" typically refers to oil that occurs in low volume, as compared to commodity oils, has unique functionality or improved health benefits. Many of these specialty oils have anti-bacterial properties and, therefore, can be used to treat infections. Skin care preparations have used oils in formulations for centuries. Additionally, specialty oils have significant health benefits. They can treat a number of serious medical conditions such as diabetes, high blood pressure and cholesterol, migraine headaches, and even certain types of cancer. Specialty oils are able to preserve cell membrane function due to their high content of essential fatty acids and are also rich in antioxidants.

There are a number of oils that fit into the category of specialty oils, many of which are quite expensive. Some oils representatively used in the present invention include, but are not limited to, the following: borage, evening primrose, flaxseed, hemp, black currant, walnut, jojoba, and rosehip seed. It will be apparent to those skilled in the art that other oils may be used with this invention. These oils are a natural source of essential fatty acids that cannot be synthesized by the body (animal or human). Therefore, they must be obtained through proper diet. Deficiency of essential fatty acids has been identified in mental disorders, diabetes, atherosclerosis, hypertension, immune dysfunction, and inflammatory conditions. Each of these oils has specific applications and benefits. For example, borage oil, one of the most expensive oils, helps to repair sun damaged and aging skin, as well as maintain healthy skin. Hemp oil can be absorbed directly into the skin. Jojoba oil is often used in hair care products and applications.

Another specialty oil of great value is sesame oil. Sesame is cultivated in India, China, Sudan, Korea, and Mexico. The oil, which is rich in antioxidants and pain relieving compounds and high in polyunsaturated fat, has natural antibacterial, antiviral, and anti-inflammatory properties. In fact, it has been used in the treatment of conditions such as diabetes, hepatitis, and migraine headaches. Studies have also shown that sesame oil has inhibited the growth of malignant melanoma and the replication of human colon cancer cells due to the fact that it is a cell growth regulator and, therefore, can slow down replication and cell growth. Other research has shown a variety of benefits from the use of sesame oil such as reduction of the bacteria that causes gingivitis, cure of chronic sinusitis, protection from UV rays, and maintenance of beautiful skin. Therefore, because of its human health benefits, as well as the fact that it is a low volume product, sesame oil is considered to be a specialty oil.

Sesame seeds are comprised of approximately 50% to 60% fatty oil containing compounds such as sesamin, sesamolin, and sesaminol. Sesaminol is present in the seeds mainly as glycoside, and it can be produced from sesamolin. More than 75% of sesame oil consists of unsaturated fatty acids, with almost equal portions of oleic and linoleic acid.

In most Asian countries, hot-pressed sesame oil is preferred. The sesame seeds are toasted before pressing. Toasting the seeds increases their flavor, which is a result of the compounds 2-furylmethanthiol, 2-methoxyphenol (guajacol), phenylethanthiol, and 4-hydroxy-2,5-dimethyl-3(2H) furanone (furaneol). Also adding to the flavor are vinylguacol, 2-pentylpyridine, and other N-containing heterocycles.

Specialty oils are obtained from seeds either by mechanical pressing or by extraction. Extraction tends to be a chemical treatment via an organic solvent, such as hexane or a supercritical fluid, such as carbon dioxide.

In the case of specialty oils, mechanical pressing is the preferable route. This is because there is no residual organic solvent left in the cake. There is no evaporation required in either the oil or in the cake. Therefore, these products are very attractive to the organic market. However, mechanical pressing leaves residual oil in the cake. The amount of residual oil depends mainly of the type of expeller and the temperatures used. Additionally, the cake is wasted or used in applications such as feed for livestock for a very low price. The fact remains that each time this process is performed, a significant portion of the specialty oil is not recovered. Because specialty oils are such valuable commodities, the recovery of the oil in the cake would have great economic implications.

An expeller press uses friction and continuous pressure from a screw drive to move and compress the seed material. The oil seeds pass through small openings that do not allow seed fiber solids to pass through. Afterward, the pressed seeds are formed in the press into a hardened cake, which is generally regarded as waste. The residual oil content in the cake depends mainly of the type of the expeller and the temperatures used (cold or hot pressing). The residual oil content in the cake ranges anywhere from 5 to 10 weight percent (wt. %). However, in some cases, such as sesame seeds, the residual oil content can be as high as 20%. At present, the issue of recovering the residual oil from these cakes has not been readily addressed. Historically, the cake is usually discarded or given to livestock for feed.

BRIEF SUMMARY OF THE INVENTION

One embodiment of the present invention provides for a method for recovering residual specialty oil from a cake using a compressed solvent by first heating the compressed solvent. The specialty oil is extracted from the cake using the compressed solvent. The compressed solvent is then expanded and heated to vapor phase. Finally, the specialty oil is separated from the compressed solvent.

Another embodiment of the present invention provides for a method for recovering residual specialty oil from a cake using a compressed solvent. First, the compressed solvent is heated. Next the specialty oil is extracted from a cake using the compressed solvent. The compressed solvent is expanded and heated to vapor phase. Finally, the specialty oil is separated from the compressed solvent. This embodiment of the present invention contemplates that the specialty oil is selected from the group consisting of borage, evening primrose, flaxseed, hemp, black currant, walnut, jojoba, rosehip seed, and sesame seed.

BRIEF DESCRIPTION OF THE DRAWINGS

For the present invention to be easily understood and readily practiced, the invention will now be described, for the purposes of illustration and not limitation, in conjunction with the following figures, wherein.

DETAILED DESCRIPTION OF THE INVENTION

One embodiment of the present invention provides a novel means for recovering residual specialty oil using a compressed solvent. In the present invention, a compressed solvent is used to extract the remaining specialty oil from a cake. Once the mechanical treatment has been performed and the initial oil has been removed, the cake is processed by extraction. This involves the steps of heating the compressed solvent, extracting the specialty oil from the cake using the compressed solvent, expanding and heating the compressed solvent to vapor phase, and separating the specialty oil from the compressed solvent.

In one embodiment of the present invention, the specialty oil contained in the cake is selected from the group consisting of borage, evening primrose, flaxseed, hemp, black currant, walnut, jojoba, rosehip seed, and sesame seed. It will be obvious to one skilled in the art that this invention may be applied to, and includes, other oils.

In one embodiment of the present invention the compressed solvent used in the process is selected from the group consisting of ethane, propane, carbon dioxide, ethanol, nitrous oxide, butane, isobutene, sulfur hexafluoride, trifluoromethane, dimethylether, or a combination thereof. It will be obvious to one skilled in the art that this invention may include other solvents. However, the preferred compressed solvent is carbon dioxide.

In some embodiments of the present invention, the oil in the cake could be directly extracted using a supercritical fluid or the cake could be roasted again before extraction. Additionally, the process can be carried out under a range of operating conditions. In various embodiments of the present invention, temperatures can range between 32° C. and 120° C. and pressures can be in the range of 20 bar to 1000 bar, preferably above 550 bar. The amount of oil extracted from the cake is preferably greater than or equal to 90%. Extraction using a compressed solvent allows for oil recovery greater than 90% in a single step. Extraction with a traditional organic solvent, such as hexane, requires the additional steps of solvent evaporation as well as the necessity of toasting the cake. Other advantages to using the compressed solvent at higher pressures are shorter extraction times and a lower solvent to feed ratio. The compressed solvent can be recycled, preferably, under supercritical or subcritical conditions. Additionally, in some embodiments of the present invention, the entire process is continuous.

Figure 1:
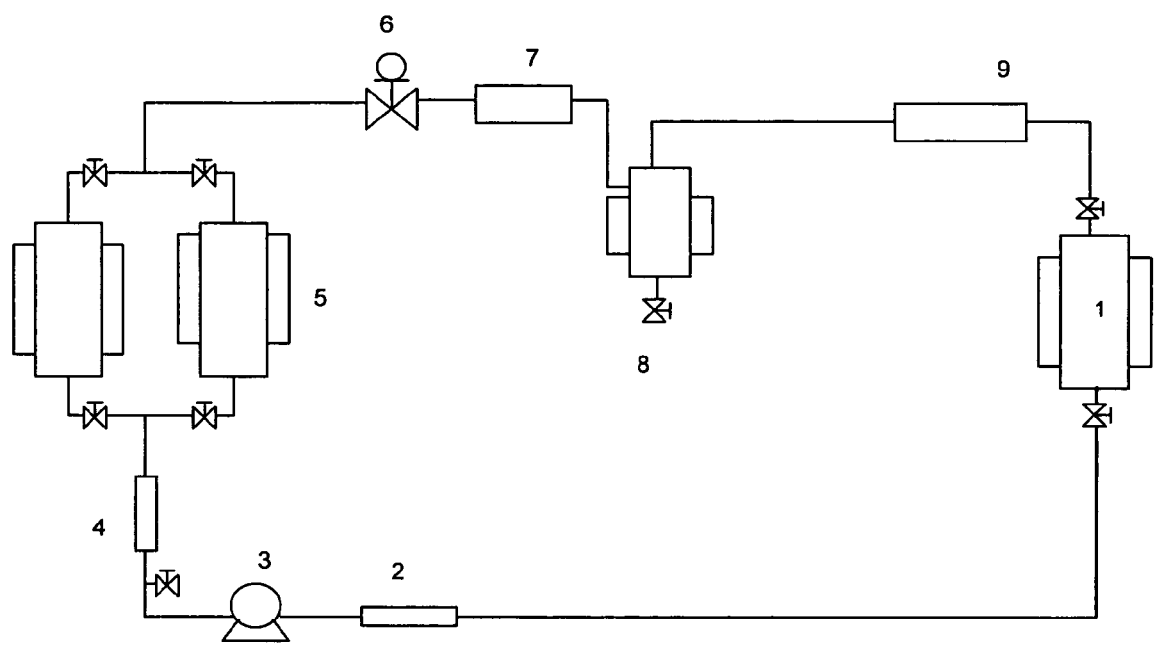
FIG. 1 shows one embodiment of the present invention in which the extraction involves the use of a storage tank, a precooler, a pump, a preheater, an extractor, a pressure regulator, a high pressure vaporizer, a cyclone separator, and a condenser.

FIG. 1 is one example of one embodiment of the present invention. A compressed solvent is pumped from a storage tank 1 to a low pressure precooler 2 before entering a pump 3. The pump 3 pumps the compressed solvent to the desired extraction pressure. The compressed solvent then enters a high pressure preheater 4 to attain the desired extraction temperature. The cake containing the residual specialty oil is located in the extractor 5. The compressed solvent enters the extractor 5 and extracts the specialty oil from the cake. The compressed solvent and the extracted oil next move through an automated back pressure regulator 6 and a high pressure vaporizer 7. The oil is then separated from the compressed solvent in a cyclone separator 8. Finally, the compressed solvent then passes through a low pressure condenser 9 before being recycled back to the storage tank 1.

In some embodiments of the invention, additional cyclone separators may be added to the system in case additional separations are required. Multiple extraction vessels in series can also be implemented.

Figure 2:
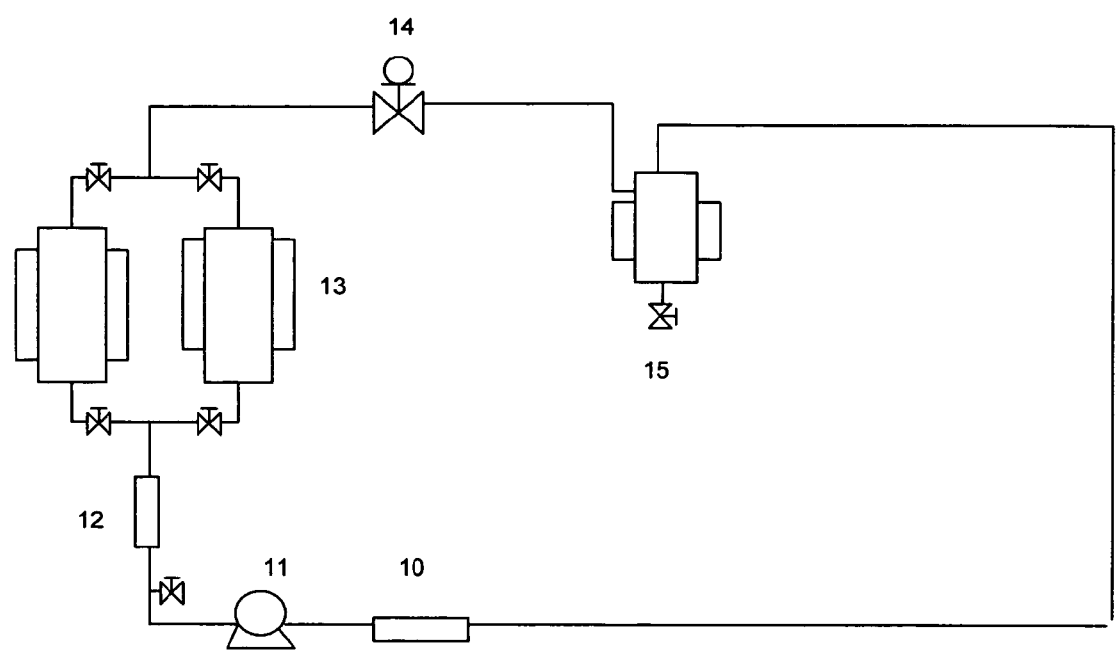
FIG. 2 illustrates another embodiment of the present invention in which high pressure recycling is performed.

FIG. 2 is an example of another embodiment of the present invention in which high pressure recycling is performed. A compressed solvent is pumped to a low pressure precooler 10 before entering a pump 11. The pump 11 pumps the compressed solvent to the desired extraction pressure. The compressed solvent then enters a high pressure preheater 12 to attain the desired extraction temperature. The cake containing the residual specialty oil is located in the extractor 13. The compressed solvent enters the extractor 13 and extracts the specialty oil from the cake. The compressed solvent and the extracted oil next move through an automated back pressure regulator 14. The oil is then separated from the compressed solvent in a cyclone separator 15. In other embodiments of the invention, additional cyclone separators may be added to the system in case additional separations are required. Multiple extraction vessels in series can also be implemented.

In one embodiment of the present invention, the compressed solvent is carbon dioxide with an extraction temperature range of 32° C. to 120° C. and extraction pressure range of 20 to 1000 bar, preferably above 550 bar. The amount of residual specialty oil extracted from the cake is at least 90% and the compressed solvent can be recycled under supercritical or subcritical conditions.

The following examples clearly illustrate some embodiments of the present invention:

EXAMPLE 1

500 grams of roasted sesame powder (after pressing) were placed into a 1 liter extraction vessel system manufactured by Thar Technologies, Inc. The oil content in the cake was 20%. The experimental conditions used can be found in the following table.

| Experimental conditions: | | |
|---|---|---|
| Temperature | (° C.) | 40 |
| Pressure | (bar) | 400 |
| $CO_2$ flow rate | (g/min) | 50 |
| Cyclone pressure | (bar) | 40 |
| Cyclone temperature | (° C.) | 25 |

Recovery of oil based on hexane extraction: 95%

EXAMPLE 2

6 kilograms of roasted sesame powder (after pressing) were placed into a 12 liter extraction vessel system manufactured by Thar Technologies, Inc. The oil content in the cake was 9.5%. The experimental conditions used can be found in the following table.

| Experimental conditions: | | |
|---|---|---|
| Temperature | (° C.) | 40 |
| Pressure | (bar) | 550 |
| $CO_2$ flow rate | (kg/min) | 1 |
| Cyclone pressure | (bar) | 67 |
| Cyclone temperature | (° C.) | 27 |

Recovery of oil based on hexane extraction: 96.5%

EXAMPLE III 4 kilograms of roasted sesame powder (after pressing) were placed into a 12 liter extraction vessel system manufactured by Thar Technologies, Inc. The oil content in the cake was 21%. The experimental conditions used can be found in the following table.

| Experimental conditions: | | |
|---|---|---|
| Temperature | (° C.) | 60 |
| Pressure | (bar) | 800 |
| $CO_2$ flow rate | (g/min) | 1000 |
| Cyclone pressure | (bar) | 55 |
| Cyclone temperature | (° C.) | 28 |

Recovery of oil based on hexane extraction: 97%

EXAMPLE IV 500 grams of flaxseed powder (after pressing) were placed into a 1 liter extraction vessel system manufactured by Thar Technologies, Inc. The oil content in the cake was 12%. The experimental conditions used can be found in the following table.

| Experimental conditions: | | |
|---|---|---|
| Temperature | (° C.) | 60 |
| Pressure | (bar) | 600 |
| $CO_2$ flow rate | (g/min) | 100 |
| Cyclone pressure | (bar) | 55 |
| Cyclone temperature | (° C.) | 40 |

Recovery of oil based on hexane extraction: 95.2%

We claim:

1. A method for recovering residual specialty oil from a cake using a compressed solvent comprising the steps of:
   a. heating the compressed solvent;
   b. extracting the specialty oil from a cake using the compressed solvent;
   c. expanding and heating the compressed solvent to vapor phase;
   d. separating the specialty oil from the compressed solvent; and
   e. wherein the cake contains a solid selected from the group consisting of borage, evening primrose, flaxseed, hemp, black currant, walnut, jojoba, rosehip seed, and sesame seed.

2. The method according to claim 1 wherein the compressed solvent is selected from the group consisting of ethane, propane, carbon dioxide, ethanol, nitrous oxide, butane, isobutene, sulfur hexafluoride, trifluoromethane, dimethylether, and a combination thereof.

3. The method according to claim 1 wherein the desired extraction temperature is in the range of 32° C. to 120° C.

4. The method according to claim 1 wherein the desired extraction pressure is in the range of 20 bar to 1000 bar.

5. The method according to claim 1 wherein the amount of residual specialty oil extracted from the cake is at least 90%.

6. The method according to any one of the claims 1, and 2 through 5 wherein the compressed solvent is recycled.

7. The method according to claim 6 wherein the compressed solvent is recycled under supercritical conditions.

8. The method according to claim 6 wherein the compressed solvent is recycled under subcritical conditions.

9. The method according to claim 1 wherein the cake is toasted before extraction.

10. The method according to claim 1 wherein the process is continuous.

11. A method for recovering residual specialty oil from a cake using a compressed solvent comprising the steps of:
    a. heating the compressed solvent;
    b. extracting the specialty oil from a cake using the compressed solvent;
    c. expanding and heating the compressed solvent to vapor phase;
    d. separating the specialty oil from the compressed solvent; and
    e. wherein the specialty oil is selected from the group consisting of borage, evening primrose, flaxseed, hemp, black currant, walnut, jojoba, rosehip seed, and sesame seed.

12. The method according to claim 11 wherein the compressed solvent is selected from a group consisting of ethane, propane, carbon dioxide, ethanol, nitrous oxide, butane, isobutene, sulfur hexafluoride, trifluoromethane, dimethylether, and a combination thereof.

13. The method according to claim 11 wherein the desired extraction temperature is in the range of 32° C. to 120 ° C.

14. The method according to claim 11 wherein the desired extraction pressure is in the range of 20 bar to 1000 bar.

15. The method according to claim 11 wherein the amount of residual specialty oil extracted from the cake is at least 90%.

16. The method according to any one of the claims 11 through 15 wherein the compressed solvent is recycled.

17. The method according to claim 16 wherein the compressed solvent is recycled under supercritical conditions.

18. The method according to claim 16 wherein the compressed solvent is recycled under subcritical conditions.

19. The method according to claim 11 wherein the cake is toasted.

20. The method according to claim 1 wherein the process is continuous.

* * * * *